(12) United States Patent
Gurr

(10) Patent No.: US 7,828,873 B2
(45) Date of Patent: Nov. 9, 2010

(54) FOREHEARTH

(75) Inventor: Matthew John Gurr, Booragoon (AU)

(73) Assignee: Technological Resources Pty. Limited, Melbourne, Victoria (AU)

( * ) Notice: Subject to any disclaimer, the term of this patent is extended or adjusted under 35 U.S.C. 154(b) by 178 days.

(21) Appl. No.: 11/912,781

(22) PCT Filed: Apr. 26, 2006

(86) PCT No.: PCT/AU2006/000545

§ 371 (c)(1),
(2), (4) Date: Jun. 11, 2008

(87) PCT Pub. No.: WO2006/113969

PCT Pub. Date: Nov. 2, 2006

(65) Prior Publication Data

US 2008/0302213 A1    Dec. 11, 2008

(30) Foreign Application Priority Data

Apr. 26, 2005    (AU) ............................. 2005902093

(51) Int. Cl.
*C21C 5/42*    (2006.01)
*C21C 7/072*   (2006.01)
*C21B 13/10*   (2006.01)

(52) U.S. Cl. .................... 75/508; 75/548; 75/560; 266/44; 266/275

(58) Field of Classification Search .......... 75/508, 75/548, 560; 266/44, 275
See application file for complete search history.

(56) References Cited

U.S. PATENT DOCUMENTS 5,211,555 A    5/1993    Gardner et al.
6,565,798 B2 *  5/2003    Gurr et al. ............... 266/44

FOREIGN PATENT DOCUMENTS

| EP | 0 595 103 A1 | 5/1994 |
| EP | 1 120 618 A2 | 8/2001 |
| EP | 1 241 421 A2 | 9/2002 |
| JP | 63-38507 | 2/1988 |
| JP | 10-185167 | 7/1998 |
| WO | WO 02/08471 A1 | 1/2002 |

OTHER PUBLICATIONS

E.T. Richarz, "Tapping the Lead Blast Furnace," The Metal Industry (Jul. 17, 1925), pp. 51-53.
European Search Report, Nov. 5, 2008.

* cited by examiner

*Primary Examiner*—George Wyszomierski
*Assistant Examiner*—Tima M McGuthry-Banks
(74) *Attorney, Agent, or Firm*—Finnegan, Henderson, Farabow, Garrett & Dunner, L.L.P.

(57) ABSTRACT

A direct smelting vessel (3) for operating a molten bath-based direct smelting process under pressure conditions in the vessel is disclosed. The vessel includes a forehearth (67) for tapping molten metal continuously from the vessel. The forehearth includes an open connection (97) that extends through a side wall of the vessel into the interior of the vessel. The open connection is formed to dampen the impact of sudden changes in pressure in the vessel on molten metal flow in the forehearth that could result in an undesirable surge of molten metal from the forehearth. The open connection is also formed so that molten metal does not freeze in the connection for at least 6 hours when molten metal is not being discharged from the vessel into the forehearth via the open connection.

20 Claims, 3 Drawing Sheets

FOREHEARTH

The present invention relates to a direct smelting vessel that includes a forehearth for tapping molten metal continuously from the vessel while the process is operating in the vessel.

In particular, the present invention relates to the construction of the forehearth of the direct smelting vessel.

The present invention relates particularly, although by no means exclusively, to a direct smelting vessel that can operate a molten bath-based direct smelting process for producing molten iron from iron-containing metalliferous feed material, such as iron ores, partly reduced iron ores and iron-containing waste streams (for example, from steelmaking plants).

A known molten bath-based direct smelting process is generally referred to as the HIsmelt process. In the context of producing molten iron, the HIsmelt process includes the steps of:

(a) forming a bath of molten iron and slag in a direct smelting vessel;

(b) injecting into the bath: (i) a metalliferous feed material, typically iron ore in the form of fines; and (ii) a solid carbonaceous material, typically coal, which acts as a reductant of the metalliferous feed material and a source of energy; and (c) smelting metalliferous feed material to iron in the bath.

The term "smelting" is herein understood to mean thermal processing wherein chemical reactions that reduce metal oxides take place to produce molten metal.

In the HIsmelt process metalliferous feed material and solid carbonaceous material are injected into a molten bath contained in a direct smelting vessel through a number of water-cooled lances/tuyeres which are inclined to the vertical so as to extend downwardly and inwardly through a side wall of the vessel and into a lower region of the vessel so as to deliver at least part of the solids material into the metal layer in the bottom of the vessel. A blast of hot oxygen-containing gas, typically air or oxygen-enriched air, is injected into an upper region of the vessel through a water-cooled lance that extends downwardly into the vessel to cause post-combustion of reaction gases released from the molten bath in the upper region of the vessel. Typically, in the case of producing molten iron, the hot air or oxygen-enriched air is at a temperature of the order of 1200° C. and is generated in hot blast stoves. Off-gas resulting from the post-combustion of reaction gases in the vessel is taken away from the upper region of the vessel through an off-gas duct. The vessel includes refractory-lined water-cooled panels in the side wall and a roof of the vessel, and water is circulated continuously through the panels in a continuous circuit.

The HIsmelt process enables large quantities of molten iron, typically at least 0.5 Mt/a, to be produced by direct smelting in a single compact vessel.

In order to achieve high molten iron production rates in the HIsmelt process it is necessary to (a) generate and transport large quantities of hot air or oxygen-enriched air and carrier gas (for solids injection) to the direct smelting vessel, (b) transport large quantities of the metalliferous feed material, such as iron-containing feed materials, to the vessel, including generating and transporting large quantities of carrier gas to the vessel (c) transport large quantities of hot off-gas from the vessel, (d) transport large quantities of molten iron and slag produced in the process away from the vessel, and (e) circulate large quantities of water through the water cooled panels—all within a relatively confined area.

In view of the above, high molten iron production rates require a HIsmelt process that operates under pressure conditions and a HIsmelt plant that includes (a) a pressurised direct smelting vessel and ancillary equipment such as lock hoppers for supplying solid feed materials to the vessel and pressure control equipment on the off-gas duct of the vessel, (b) stoves that produce the high flow rate of hot air or oxygen-enriched air for the vessel, and (c) off-gas treatment equipment that is capable of processing large quantities of off-gas discharged from the vessel.

A current design of a direct smelting vessel for the HIsmelt process includes a forehearth for tapping molten metal on a continuous basis from the vessel and a slag tap-hole for tapping molten slag on a periodic basis from the vessel. The forehearth includes an open connection through the side wall of the vessel into the interior of the vessel.

The use of the forehearth, with the open connection to the interior of the vessel, and operation of the vessel under pressure conditions, typically 0.8 bar gauge, means that variations in pressure in the vessel will translate directly to variations in molten metal levels in the vessel and the forehearth.

It can be appreciated from the above that operating the HIsmelt process with an open forehearth, particularly under pressure conditions, presents potentially serious safety issues that need to be addressed.

One such potentially serious safety issue arises if there is an unexpected increase in pressure within the vessel. Under such over-pressure conditions there is a risk of molten metal surging from the vessel into the forehearth and overflowing the forehearth in an uncontrolled and dangerous manner.

The present invention provides a forehearth construction that addresses the issue of limiting the extent of surges of hot metal flowing from the forehearth in over pressure situations while taking into account other factors that are relevant to the operation of the forehearth.

In general terms the present invention provides a direct smelting vessel for operating a molten bath-based direct smelting process under pressure conditions in the vessel is disclosed. The vessel includes a forehearth for tapping molten metal continuously from the vessel. The forehearth includes an open connection that extends through a side wall of the vessel into the interior of the vessel. The open connection is formed to dampen the impact of sudden changes in pressure in the vessel on molten metal flow in the forehearth that could result in an undesirable surge of molten metal from the forehearth. The open connection is also formed so that molten metal does not freeze in the connection for at least 6 hours when molten metal is not being discharged from the vessel into the forehearth via the open connection.

According to the present invention there is provided a direct smelting vessel for operating a molten bath-based direct smelting process for smelting a metalliferous feed material and producing molten metal under pressure conditions in the vessel, which vessel includes:

(a) a hearth adapted to contain a metal layer of the molten bath, the hearth having a base and a side wall;

(b) a side wall that extends upwardly from the side wall of the hearth;

(c) a plurality of water-cooled solids injection lances extending downwardly and inwardly into the vessel for injecting solids feed materials such as metalliferous feed material and/or carbonaceous material, into the vessel;

(d) one or more than one water-cooled oxygen-containing gas injection lances extending downwardly into the vessel for injecting an oxygen-containing gas into the vessel; and (e) a forehearth for tapping molten metal continuously from the vessel, the forehearth including (i) a chamber that can hold a volume of molten metal and has an outlet for discharging molten metal from the chamber and (ii) an open connection that extends through the side wall of the hearth into the interior of the vessel and thereby interconnects the chamber and the interior of the vessel, the open connection being formed to dampen the impact of sudden changes in pressure in the vessel on molten metal flow in the forehearth that could result in an undesirable surge of molten metal from the forehearth, and the open connection also being formed so that molten metal does not freeze in the connection for at least 6 hours when molten metal is not being discharged from the vessel into the forehearth via the open connection.

The term "dampen" is understood herein to mean that a sudden increase in pressure in the vessel does not translate immediately to a corresponding increase in the velocity and/or the flowrate (volume or mass) of molten metal from the vessel into the forehearth that could result in an undesirable surge of molten metal from the forehearth.

The requirements for the forehearth connection described in paragraph (e) above are the result of research and development work of the applicant that has identified and recognised the significance of factors, which include competing factors, that are important to the design of a forehearth for a molten bath-based direct smelting process operating under pressure in a direct smelting vessel with continuous flow of molten metal from the vessel via the forehearth.

One factor is that the extent of refractory wear increases as the area of a vertical cross-section that is transverse to the length of the forehearth connection at the narrowest part of the forehearth connection decreases. The term "minimum transverse cross-sectional area" is understood herein to mean the area of a vertical cross-section transverse to the length of the forehearth connection at the narrowest part of the forehearth connection. A competing factor is that the extent to which the flowrate (volume or mass) of molten metal from the vessel into the forehearth can be limited increases as the minimum transverse cross-sectional area of the forehearth connection decreases. Thus, a larger minimum transverse cross-sectional area is preferable from a wear viewpoint but is less preferred from a flowrate limitation viewpoint. Moreover, a smaller minimum transverse cross-sectional area is preferable from a flowrate limitation viewpoint but is less preferred from a wear viewpoint.

Another factor is that, for a given minimum transverse cross-sectional area of the forehearth connection, the risk of freezing molten metal in the forehearth connection decreases as the length of the forehearth connection decreases. A competing factor is that, for a given minimum transverse cross-sectional area of the forehearth connection, the extent to which flow rate of molten metal from the vessel into the forehearth can be limited decreases as the length of the forehearth connection decreases. Thus, a longer length is preferable from a flowrate limitation viewpoint but is less preferred from a viewpoint of molten metal freezing in the forehearth connection. Moreover, a shorter length is preferable from a molten metal freezing viewpoint but is less preferred from a flowrate limitation viewpoint.

Another factor is that, for a given minimum transverse cross-sectional area of the forehearth connection, the velocity of molten metal flowing through the forehearth connection increases and the wear of the connection increases as the pressure change in the vessel increases. A related factor is that, for a given pressure increase within the vessel, the velocity of molten metal flowing through the forehearth connection increases and the wear of the connection increases as the minimum transverse cross-sectional area of the forehearth connection decreases.

Preferably the open connection is formed so that the maximum velocity of molten metal through the open connection is 1 m/s while the process is operating under pressure in the vessel and producing molten iron at a full production rate.

The term "full production rate" is understood herein to mean a rate required to produce the annual design production for the vessel.

The annual design production may vary considerably for different vessels. Typically, for vessels designed to produce molten iron, the annual design production is at least 800,000 tonnes and may be up to or greater than 2 million tonnes.

It is preferred particularly that the open connection is formed so that the maximum velocity of molten metal through the open connection be 0.6 m/s.

Typically, the operating pressure in the vessel while the process is operating in the vessel is at least 0.5 bar gauge.

Typically, the operating pressure in the vessel while the process is operating in the vessel is less than 1.5 bar gauge, and more typically less than 1.0 bar gauge.

Preferably the shape of the open connection is selected to include a first channel that extends from the vessel and has a uniform transverse cross-section along its length and has a minimum transverse cross-sectional area that is selected so that it can act as a throttle to or otherwise limit molten metal flow into the forehearth in over-pressure conditions in the vessel and thereby dampen the impact of sudden changes in pressure in the vessel on molten metal flow in the forehearth.

Preferably a major width dimension of the first channel is 75-200 mm.

Preferably the length of the first channel is less than 1 m.

More preferably the length of the first channel is 200-600 mm.

It is preferred particularly that the length of the first channel be 300-500 mm.

The first channel may be any suitable shape in transverse cross-section. Suitable shapes include tunnel-shaped, circular, and square.

Preferably the transverse cross-section of the first channel is tunnel-shaped with a flat base, parallel side walls extending perpendicularly to the base, and a curved roof.

Preferably the open connection also includes a second channel that extends from the first channel to the forehearth chamber and has a transverse cross-sectional area that increases with distance from the first channel.

The width or the height of the second channel may increase with distance from the first channel.

Preferably the height of the second channel increases with distance from the first channel.

Preferably the second channel is generally frusto-conical when viewed in vertical cross-section along the length of the second channel.

Preferably the second channel has a lower wall and an upper wall.

Preferably the upper wall of the second channel is more inclined to the horizontal than the lower wall of the second channel.

Preferably the upper wall of the second channel has an angle of inclination of the upper wall of the second channel to the horizontal of at least 15°.

It is preferred particularly that the angle of inclination to the horizontal be at least 20°.

Preferably the width of the second channel section initially increases with distance from the first channel and thereafter remains constant along the remainder of the length of the second channel to the forehearth chamber.

Preferably the ratio of the volume of the second channel to the volume of the first channel is at least 3:1.

More preferably the ratio of the volume of the second channel to the volume of the first channel is at least 4:1.

Typically, the forehearth connection is designed to dampen sudden increases in vessel pressure of up to 50% of the operating pressure in the vessel.

Preferably the forehearth includes pre-cast bricks/blocks or bricks/blocks that are cast in-situ that define the open connection.

Preferably the forehearth includes pressed bricks/blocks that define the forehearth chamber.

Preferably the forehearth includes a tap hole for discharging molten metal when there is a need to drain molten metal from the forehearth and the vessel. The tap hole is closed when the vessel is operating and producing metal and can be opened selectively as required if it is necessary to drain molten metal from the vessel and the forehearth.

Preferably the vessel includes pressure release valves that vent the vessel to atmosphere in the event that the vessel pressure increases to a predetermined pressure.

According to the present invention there is provided a direct smelting plant that includes the above-described direct smelting vessel for operating a molten bath-based direct smelting process under pressure for smelting a metalliferous feed material and producing molten metal.

According to the present invention there is also provided a molten bath-based direct smelting process for smelting a metalliferous feed material and producing molten metal under pressure conditions in the above-described direct smelting vessel.

The present invention is described in more detail hereinafter with reference to the accompanying drawings, of which:

The following description of the plant shown in the figures is in the context of using the plant to smelt iron-containing feed material to produce molten iron in accordance with the HIsmelt process as described in International application PCT/AU96/00197 in the name of the applicant. The disclosure in the patent specification lodged with the International application is incorporated herein by cross-reference.

The process is based on the use of a direct smelting vessel 3.

The vessel 3 is of the type described in detail in International applications PCT/AU2004/000472 and PCT/AU2004/000473 in the name of the applicant. The disclosure in the patent specifications lodged with these applications is incorporated herein by cross-reference.

Figure 2:
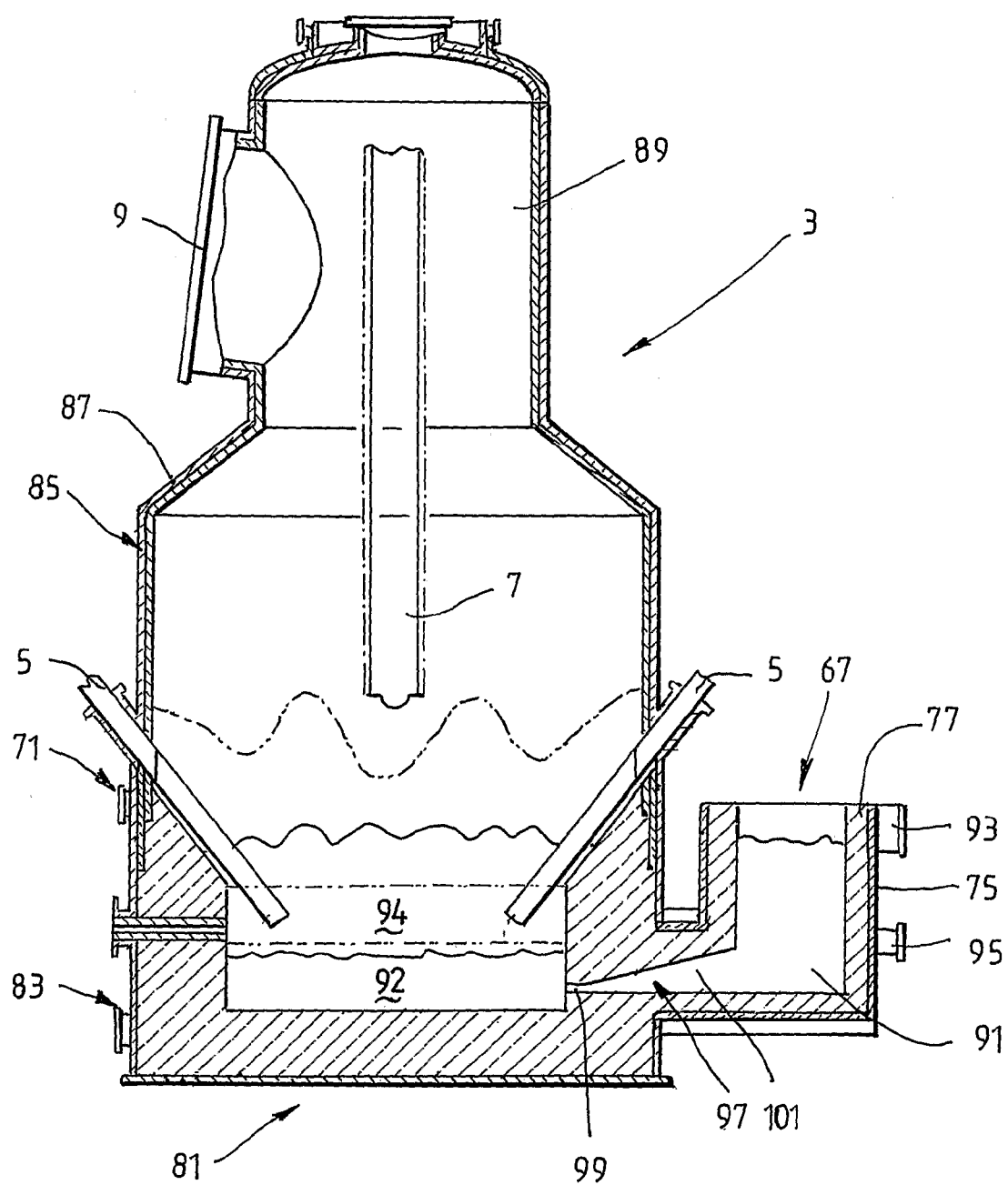
FIG. 2 is an enlarged vertical cross-section of the direct smelting vessel shown in FIG. 1 which illustrates the forehearth in more detail.

With reference to FIG. 2, the vessel 3 has a hearth that includes a base 81 and a side wall 83 formed from refractory bricks, a side wall 85 which forms a generally cylindrical barrel extending upwardly from the sides of the hearth, and a roof 87 that includes a central off-gas chamber 89, an off-gas duct 9 extending from the off-gas chamber 89, a forehearth 67 for discharging molten metal continuously from the vessel 3, and a tap hole 71 for discharging molten slag periodically from the vessel 3.

The forehearth 67 includes an outer steel shell 75 and an internal lining 77 of refractory material.

The forehearth 67 includes a main chamber or well 91 that has an outlet 93 for molten iron in an upper end of the chamber. In use, molten iron flows via the outlet 91 from the forehearth 67 and into a launder (not shown).

The forehearth 67 also includes a tap hole 95 in a lower section of the main chamber 91. In use, the tap hole 95 is closed under normal operating conditions of the process. The tap hole 95 can be opened as required to drain molten iron from the forehearth 67 and the vessel 3.

The forehearth 67 also includes a forehearth connection generally identified by the numeral 97 that interconnects the main chamber 91 and the interior of the vessel 3.

Figure 3:
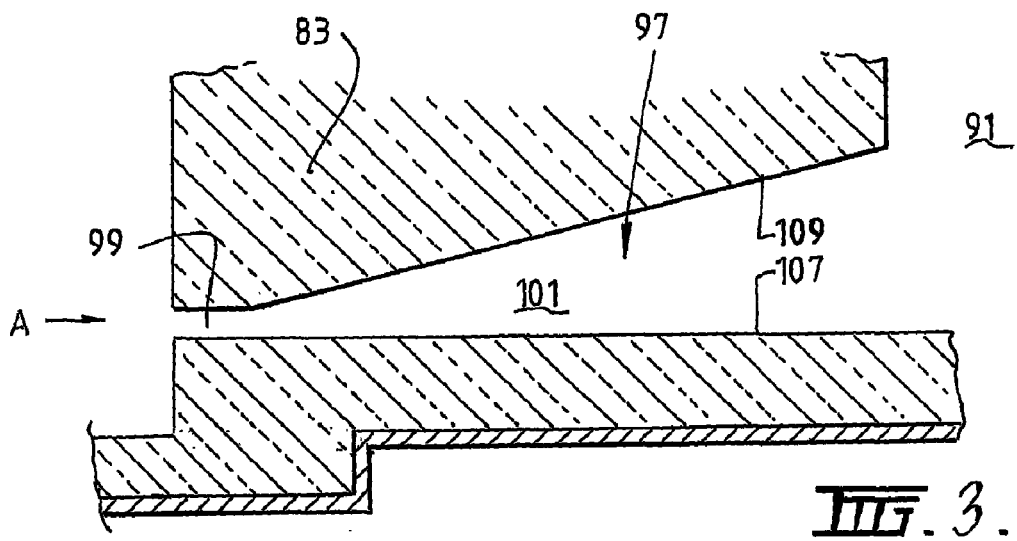
FIG. 3 is an enlarged vertical cross-section that illustrates the forehearth in more detail.
Figure 4:
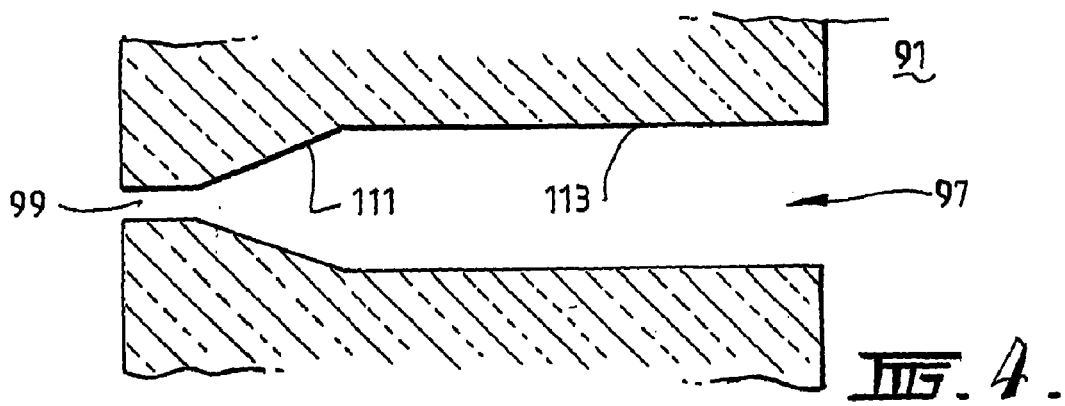
FIG. 4 is an enlarged horizontal cross-section that illustrates the forehearth in more detail.
Figure 5:
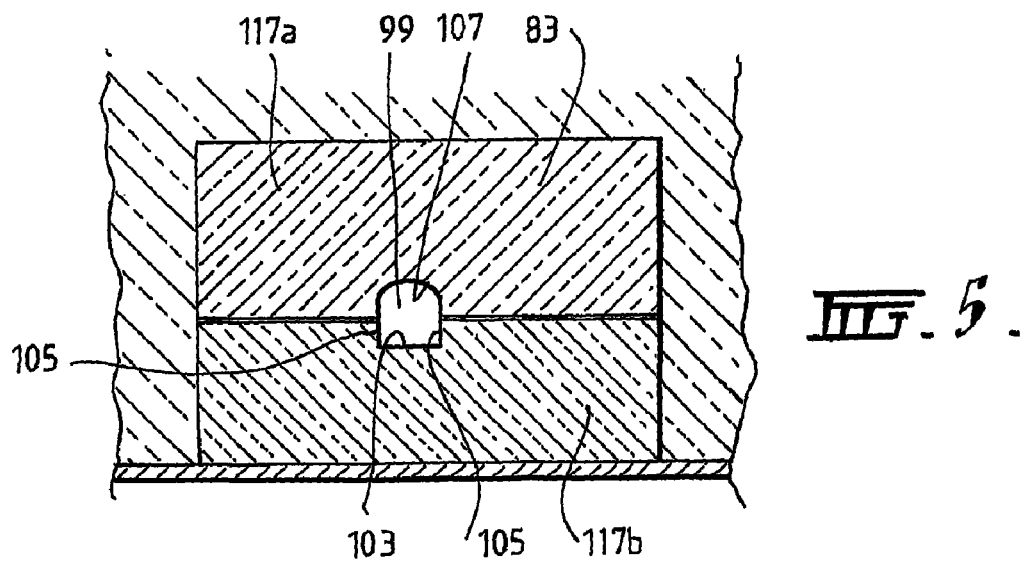
FIG. 5 is an end view of the forehearth as viewed in the direction of the arrow A in FIG. 3.

As can best be seen in FIGS. 3 to 5, the forehearth connection 97 includes:

(a) a first, relatively narrow and short, horizontal channel 99 that extends outwardly from the vessel interior, and (b) a second, increasingly wider and relatively long channel 101 that extends outwardly from the first channel 99 and opens into the main chamber 91.

The first channel 99 extends a short distance only (300 mm) into the side wall 83 of the hearth. As can best be seen in FIG. 5, the first channel 99 is tunnel-shaped in transverse section and includes a base 103, parallel side walls 103, and a curved roof 107. The first channel 99 has a height and a width of 150 mm.

The first channel 99 is formed to act as a throttle to and thereby to dampen the impact of any uncontrolled outward flow of molten iron from the vessel 3 on flow of molten iron in the main chamber 91 of the forehearth 67 in over-pressure conditions in the vessel 3.

The second channel 102 is formed to provide a transition for the flow of molten iron from the first channel 99 into the main chamber 91.

The first channel 99 and the second channel 101 are also formed having regard to the thermal requirements of the forehearth connection 97. In particular, the first channel 99 and the second channel 101 are formed so that there is sufficient heat transfer into the first channel 99 from the vessel interior and the forehearth chamber 91 (via the second channel 101) to maintain the temperature of molten iron in the first channel 99 above the liquidus temperature for at least 6 hours during an off-wind situation, i.e. when there is no molten iron being produced in the vessel 3 and being discharged via the forehearth 67.

In particular, the shape and size of the second channel 101 facilitates heat transfer into the first channel 99. With reference to FIG. 3, the second channel 101 is generally frusto-conical in vertical cross-section with a generally horizontal lower wall 107 and an upwardly inclined upper wall 109 extending at an angle of 20° to the horizontal. In particular, the second channel 101 has (a) a substantially frusto-conical first section 111 that extends for a length of 600 mm and increases in width from 150 mm to 500 mm and (b) a constant-width second section 113 that extends to the main chamber 91 of the forehearth 67. The size of the second channel 101 is such that it contains a volume of molten iron that is relatively large compared to that contained by the first channel 99.

In addition, the overall shape and size of the forehearth connection 97 and the shape, materials, and layout of the refractory lining that forms the forehearth connection 97 are selected to (a) withstand significant wear that occurs during the process due to molten iron flow through the forehearth connection 97 and (b) expand relative to the vessel 3 so that the expansion places minimal if any load on the vessel 3. With regard to the refractory lining, the lining of the forehearth connection 97 is made from pre-cast blocks of refractory material. FIG. 5 shows the ends of two such pre-cast blocks 117a and 117b. With regard to item (b), the first channel 99 is sized so that the maximum velocity of molten iron in the channel 99 is in the range 0.2-0.6 m/s when the vessel is producing molten iron at a full production rate. Typically, a full production rate corresponds with a nominal metal production rate in the range 800,000 tonnes per annum to 1,600,000 tonnes per annum for vessels having a hearth diameter in the range 6 m to 8 m respectively and operating at a pressure of the order of 0.8 bar gauge. Such production rates correspond with the processing primarily of haematite iron ore fines that have been pre-heated and are supplied to the hearth at a temperature in the order of 700° C. at a reduction degree of up to 11%.

The precast blocks that form the forhearth connection 97 provide a thermal gradient away from the molten iron in the connection 97 that is sufficient to limit propagation of cracks that may develop in these blocks during operation. A thermal gradient that limits crack propagation is advantageous due to the large size compared with typical pressed refractory bricks.

The vessel 3 is fitted with a downwardly extending water-cooled hot air blast ("HAB") lance 7 extending into a top space of the vessel 3 and eight water-cooled solids injection lances 5 extending downwardly and inwardly through the side wall 85.

In use, the vessel 3 contains a molten iron bath. Under quiescent conditions, i.e. while a direct smelting process is not operating in the vessel 3, the molten bath includes a metal layer 91 and a slag layer 93 on top of the metal layer.

In use, while a direct smelting process is operating in the vessel 3, iron-containing feed material (such as iron ore fines, iron-bearing steel plant wastes or DRI fines), coal and fluxes (lime and dolomite) are directly injected into the bath via the solids injection lances 5.

Specifically, one set of lances 5 is used for injecting iron-containing feed material and fluxes and another set of lances 5 is used for injecting coal and fluxes.

The lances 5 are water-cooled to protect them from the high temperatures inside the vessel 3 and are lined with a high wear resistant material in order to protect them from abrasion by the gas/solids mixture being injected at high velocity. The lances extend inwardly through a side wall of the vessel and downwardly toward a hearth region of the vessel. The ends of the lances are positioned above the metal layer that exits in the hearth during operation and within a portion of the hearth that contains slag.

In use, while a direct smelting process is operating in the vessel 3, iron-containing feed material is pretreated before being supplied to the vessel 3 by being preheated to a temperature in the range of 600-700° C. and prereduced in a fluidised bed preheater 17 before being injected into the bath. In one form of pre-treatment process, the iron ore is pre-treated by off-gas from the process alone or in conjunction with natural gas. The pre-reduction under these conditions may be in the order of and is typically less than 11%.

Coal and fluxes are stored in a series of lock hoppers 25 before being injected at ambient temperatures into the bath. The coal is supplied to the lock hoppers 25 via a coal drying and milling plant 71.

The injected coal de-volatilises in the bath, thereby liberating $H_2$ and CO. These gases act as reductants and sources of energy. The carbon in the coal is rapidly dissolved in the bath. The dissolved carbon and the solid carbon also act as reductants, producing CO as a product of reduction. The injected iron-containing feed material is smelted to molten iron in the bath and is discharged continuously via the forehearth 67. Molten slag produced in the process is discharged periodically via the slag tap hole 71.

The process operates under pressure conditions, typically 0.8 bar gauge, in the vessel 3.

Operating the process under pressure conditions in the vessel 3 with the open connection to the exterior of the vessel 3 (via the forehearth 67) presents safety risks in both under-pressure and over-pressure conditions in the vessel 3 caused by unexpected perturbations in the process.

In over-pressure conditions in the vessel 3 the safety risk arises from the possibility of a surge of molten iron flowing from the vessel 3 into and from the forehearth 67 in an uncontrolled manner. The above-described first channel 99 of the forehearth connection 97 acts as a throttle to and thereby dampens the impact of any such uncontrolled outward flow of molten iron on the flow of molten iron in the forehearth 67. In particular, the first channel 99 ensures that a sudden increase in pressure in the vessel 3 does not translate immediately to a corresponding increase in the velocity and/or the flowrate (volume or mass) of molten iron from the vessel 3 into the forehearth 67 that could result in an undesirable surge of molten metal from the forehearth 67.

The typical reduction reactions involved in smelting injected iron-containing feed material to molten iron that occur in the bath are endothermic. The energy required to sustain the process and, more particularly these endothermic reactions, is provided by reacting CO and $H_2$ released from the bath with oxygen-enriched air injected at high temperatures, typically 1200° C., into the vessel 3 via the HAB lance 7.

Energy released from the above-described post combustion reactions in the vessel top space is transferred to the molten iron bath via a "transition zone" in the form of highly turbulent regions above the bath that contain droplets of slag and iron. The droplets are heated in the transition zone by the heat generated from post combustion reactions and return to the slag/iron bath thereby transferring energy to the bath.

The hot, oxygen-enriched air injected into the vessel 3 via the HAB lance 7 is generated in a pair of hot blast stoves 11 by passing a stream of oxygen-enriched air (nominally containing 30 to 35% by volume $O_2$) through the stoves 11 and heating the air and thereafter transferring the hot oxygen-enriched air to the HAB lance 7 via a hot blast main 41.

Off-gas is released from the vessel 3 via the off-gas duct 9 in the upper section of the vessel 3 and passes initially through a radiation cooler, hereinafter referred to as an "off-gas hood", 15. Typically, the off-gas is at a temperature of the order of 1450° C.

The off-gas is cooled as it passes through the off-gas hood 15 and thereby results in the generation of steam which accumulates in steam drum 35. The off-gas hood may be of a type described in U.S. Pat. No. 6,585,929 that cools and partially cleans off-gas.

The off-gas stream leaving the off-gas hood 15 is at a temperature of approximately 1000° C. and is split into two streams.

One split off-gas stream leaving the off-gas hood 15, which comprises between 55-65% of the off-gas from the vessel 3, passes first through a wet cone scrubber 21.

The scrubber 21 quenches and removes particulate material and soluble gaseous species and metal vapours from off-gas flowing through the scrubber. The off-gas temperature drop in the scrubber is from approximately 1000° C. to below 100° C. and typically between 65° C. and 90° C.

The off-gas from the scrubber 21 leaves the scrubber 21 passes through an off-gas cooler 23 that further cools the off-gas to below 50° C., typically between 30° C. and 45° C., to remove sufficient moisture from the off-gas for it to be used as a fuel gas. Typically the off-gas leaving the cooler has 5% or less $H_2O$ and a mist content of less than 10 mg/$Nm^3$ and typically 5.0 mg/$Nm^3$.

The resulting off-gas is suitable for use as a fuel gas in (a) the stoves 11 (as described above) and (b) the WHR system 25. In addition, the scrubbed and cooled off-gas is suitable for drying coal in the drying and milling plant 71.

For the above purposes, the off-gas from the off-gas cooler 23 is split into three streams, with one stream being passed to the stoves 11, another stream being passed to the WHR system 25, and the third stream being passed to the drying and milling plant 71.

The off-gas stream from off-gas cooler 23 is a relatively rich off-gas. The stream that is passed to the WHR system 25 is mixed with cooled and cleaned off-gas that has passed through the preheater 17 as described hereinafter, which is a relatively lean off-gas, due to some pre-reduction of the ferrous feed material in the pre-heater by CO and $H_2$ in the off-gas.

The combined off-gas stream has a calorific value that makes it suitable for combustion as a fuel gas.

Figure 1:
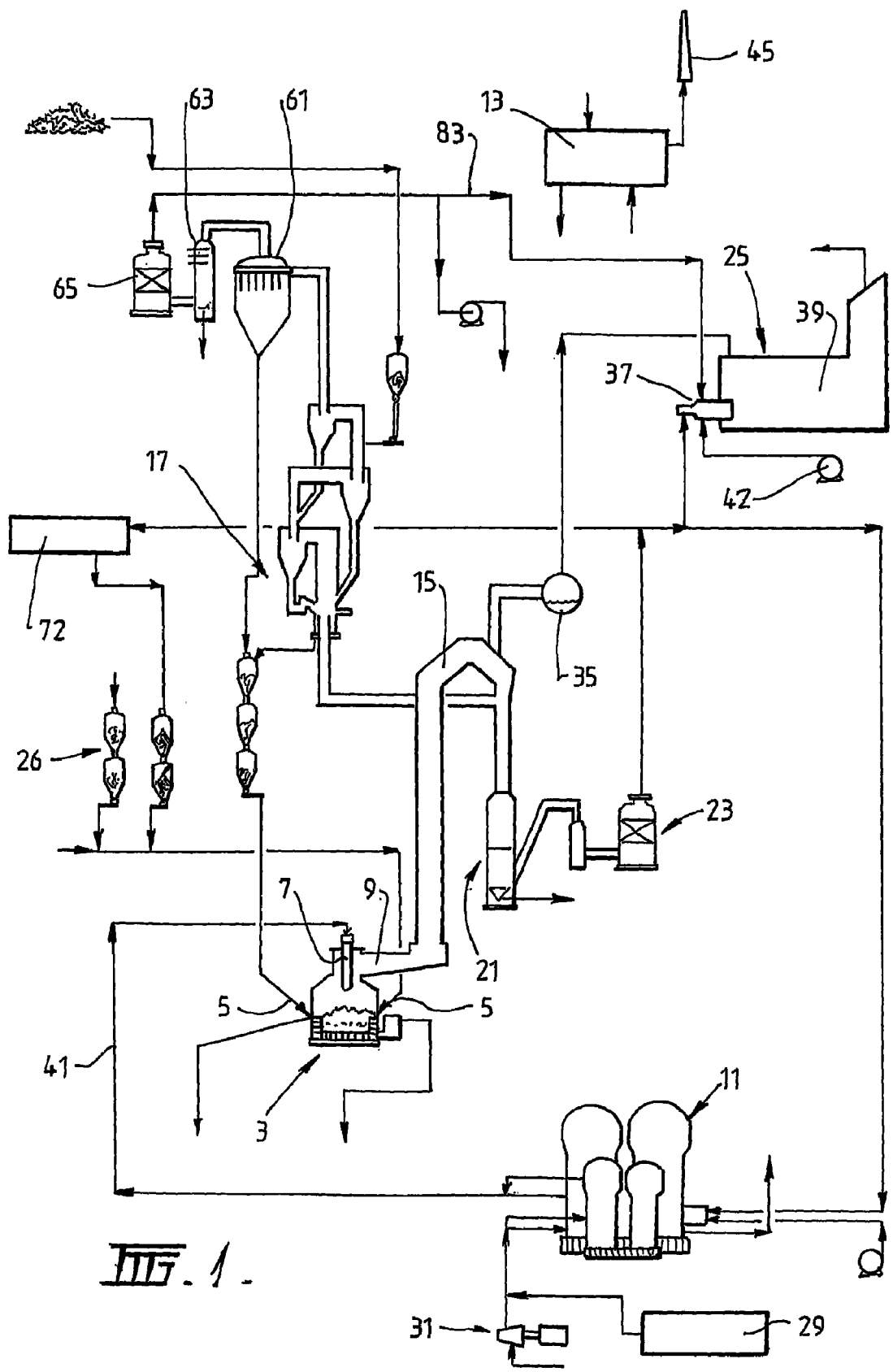
FIG. 1 is a diagrammatic view of one embodiment of a direct smelting plant that includes a direct smelting vessel in accordance with the present invention.

The combined off-gas stream, an additional source of fuel gas in the form of natural gas (indicated by the numeral 83 in FIG. 1), and air are supplied to and combusted in the WHR system 25.

The combined off-gas stream is combusted within the WHR system 25 in a manner that maximises CO destruction, while minimising $NO_x$ formation.

The off-gas released from the WHR system 25 is combined with off-gas gas from the stoves 11 and then passes to the FGD system 13. $SO_2$ is removed in the FGD system 23 and the exhaust gas is released to the atmosphere via a stack 45.

The other split stream, which contains approximately 35-45% by volume of the off-gas stream, is passed through the fluidised bed preheater 17 for iron-containing feed material. The preheater 17 removes moisture from and preheats and prereduces the iron-containing feed material. The off-gas is a source of energy and a fluidising gas in the preheater 17.

The off-gas released from the preheater 17 is passed through a cyclone 61 and entrained dust is separated from the off-gas.

The off-gas then passes through a wet cone scrubber 63 that removes particulate material and soluble gaseous species and metal vapours from the off-gas and cools the off-gas from between 500° C. and 200° C. to below 100° C. and typically between 65° C. and 90° C.

The off-gas from the scrubber 63 then passes through an off-gas cooler 65 that further cools the off-gas to below 50° C., typically between 30° C. and 45° C., to remove sufficient moisture from the off-gas for it to be used as a fuel gas. Typically the off-gas leaving the cooler has 5% or less $H_2O$ and a mist content of less than 10 mg/$Nm^3$ and typically 5.0 mg/$Nm^3$.

As is described above, the cooled and cleaned off-gas is then used as a fuel gas in a waste heat recovery (WHR) system 25.

The use of the off-gas as a fuel gas within a plant offsets an amount of electrical power that would otherwise need to be obtained from an external electricity supply grid, which makes the plant generally self sufficient in terms of electrical power.

Many modifications may be made to the embodiment of the present invention described above without departing from the spirit and scope of the invention.

By way of example, whilst the first channel 99 of the forehearth connection 97 of the vessel 3 shown in the Figures is tunnel-shaped in transverse cross-section, it can readily be appreciated that the present invention is not so limited and extends to any suitable shapes, including circular and square.

The invention claimed is:

1. A direct smelting vessel for operating a molten bath-based direct smelting process for smelting a metalliferous feed material and producing molten metal under pressure conditions in the vessel, which vessel includes:
   (a) a hearth adapted to contain a metal layer of the molten bath, the hearth having a base and a hearth side wall;
   (b) a vessel side wall that extends upwardly from the hearth side wall;
   (c) a plurality of water-cooled solids injection lances extending downwardly and inwardly into the vessel for injecting solids feed materials into the vessel;
   (d) at least one water-cooled oxygen-containing gas injection lance extending downwardly into the vessel for injecting an oxygen-containing gas into the vessel; and
   (e) a forehearth for tapping molten metal continuously from the vessel, the forehearth including:
      (i) a chamber that can hold a volume of molten metal and has an outlet for discharging molten metal from the chamber, and
      (ii) an open connection that extends through the hearth side wall to an interior of the vessel and thereby interconnects the chamber and the interior of the vessel, the open connection including a first channel, the first channel having a length of 200 mm to 600 mm that extends from the vessel and a uniform transverse cross-section along its length, the transverse cross-section having a cross-sectional area that is a minimum transverse cross-sectional area of the open connection and that is selected to limit molten metal flow into the forehearth in over-pressure conditions in the vessel and thereby dampen the impact of sudden changes in pressure in the vessel on molten metal flow in the forehearth that could result in an undesirable surge of molten metal from the forehearth, and the open connection also being formed so that molten metal does not freeze in the open connection for at least 6 hours when molten metal is not being discharged from the vessel into the forehearth via the open connection.

2. The vessel defined in claim 1 wherein the open connection is formed so that the maximum velocity of molten metal through the open connection is 1 m/s while producing molten iron at a full production rate under pressure conditions in the vessel.

3. The vessel defined in claim 1 wherein the open connection is formed so that a maximum velocity of molten metal through the open connection is 0.6 m/s while producing molten iron at a full production rate under pressure conditions in the vessel.

4. The vessel defined in claim 1, wherein a major width dimension of the first channel is 75 mm to 200 mm.

5. The vessel defined in claim 1, wherein the length of the first channel is 300 mm to 500 mm.

6. The vessel defined in claim 1 wherein the first channel, in transverse cross-section, is any one of tunnel-shaped, circular, and square.

7. The vessel defined in any one of claims 4, 5, or 6, wherein the open connection also includes a second channel that extends from the first channel to the forehearth chamber and has a transverse cross-sectional area that increases with distance from the first channel.

8. The vessel defined in claim 7 wherein a width or a height of the second channel increases with distance from the first channel.

9. The vessel defined in claim 7 wherein a height of the second channel increases with distance from the first channel.

10. The vessel defined in claim 9 wherein the second channel is generally frusto-conical when viewed in vertical cross-section along a length of the second channel.

11. The vessel defined in claim 9 wherein the second channel has a lower wall and an upper wall.

12. The vessel defined in claim 11 wherein the upper wall of the second channel is more inclined horizontal than the lower wall of the second channel.

13. The vessel defined in claim 12 wherein the upper wall of the second channel has an angle of inclination with respect to the horizontal of at least 15°.

14. The vessel defined in claim 12 wherein an angle of inclination of the upper wall of the second channel with respect to the horizontal is at least 20°.

15. The vessel defined in claim 7 wherein a width of the second channel initially increases with distance from the first channel and thereafter remains constant along a remainder of a length of the second channel to the forehearth chamber.

16. The vessel defined in claim 1 wherein the open connection is designed to dampen sudden increases in vessel pressure of up to 50% of an operating pressure in the vessel.

17. The vessel of claim 1, wherein the solids feed materials include at least one of metalliferous feed material or carbonaceous material.

18. A molten bath-based direct smelting process for smelting a metalliferous feed material and producing molten metal under pressure in the direct smelting vessel defined in claim 1, the direct smelting process comprising the steps of:

(a) providing a molten bath having the metal layer and a slag laver;
  (b) injecting the solids feed materials into the vessel via the plurality of water-cooled solids injection lances;
  (c) injecting the oxygen-containing gas into the vessel through the at least one water-cooled oxygen-containing gas injection lance;
  (d) smelting the metalliferous material and producing the molten metal; and
  (e) tapping the molten metal from the vessel through the forehearth via the first channel of the open connection.

19. The process defined in claim 18 wherein an operating pressure in the vessel is at least 0.5 bar gauge.

20. The process defined in claim 18 or claim 19 wherein the operating pressure in the vessel is less than 1.5 bar gauge.

* * * * *

UNITED STATES PATENT AND TRADEMARK OFFICE
CERTIFICATE OF CORRECTION

PATENT NO. : 7,828,873 B2
APPLICATION NO. : 11/912781
DATED : November 9, 2010
INVENTOR(S) : Matthew John Gurr Page 1 of 1

It is certified that error appears in the above-identified patent and that said Letters Patent is hereby corrected as shown below:

Claim 7, col. 10, line 63, "claims 4, 5, or 6," should read --claims 1, 4, 5, or 6,--.

Claim 12, col. 11, line 12, "inclined horizontal" should read --inclined to horizontal--.

Claim 18, col. 12, line 9, "laver;" should read --layer;--.

Signed and Sealed this
Nineteenth Day of June, 2012

David J. Kappos
*Director of the United States Patent and Trademark Office*